United States Patent [19]

Weber et al.

[11] 4,199,226
[45] Apr. 22, 1980

[54] LASER TRANSMITTING AND RECEIVING DEVICE

[75] Inventors: Heinz P. Weber, Kehrsatz; Claude Voumard, Bern, both of Switzerland; Rene P. Salathé, Berkeley Heights, N.J.

[73] Assignee: Institut für Angewandte Physik der Universtitat Bern, Bern, Switzerland

[21] Appl. No.: 887,056

[22] Filed: Mar. 16, 1978

[30] Foreign Application Priority Data

Apr. 1, 1977 [CH] Switzerland .......................... 4117/77

[51] Int. Cl.² ............................................. G02B 27/00
[52] U.S. Cl. ........................................................ 350/157
[58] Field of Search ........................................ 350/157

[56] References Cited

U.S. PATENT DOCUMENTS

| | | | |
|---|---|---|---|
| 3,401,590 | 9/1968 | Massey | 350/157 |
| 3,406,354 | 10/1968 | Dumanchin | 350/157 |
| 3,407,364 | 10/1968 | Turner | 350/157 |
| 3,442,571 | 5/1969 | Itzkan | 350/157 |
| 3,969,573 | 7/1976 | Bouwhuis et al. | 350/157 |

Primary Examiner—John K. Corbin
Assistant Examiner—R. A. Rosenberger
Attorney, Agent, or Firm—Brady, O'Boyle & Gates

[57] ABSTRACT

A laser for the production and radiation of monochromatic light to a first polarizer arranged in the beam path of a resonator of the laser and operative to pass one of two light beam components linearly polarized perpendicularly to one another and to deflect the other linearly polarized component out of the resonator onto a photodetector for detecting that reflected part of the radiated light. A second polarizer is arranged in the direction of radiation of the light beam, behind a decoupling mirror of the resonator, and is operative to convert linearly-polarized light into circularly-polarized light. Adjacent the second polarizer in the direction of radiation is a collimator consisting of an optical system for widening the transmission beam to a remote reflector and narrowing the reflected beam received from the remote reflector back into the second polarizer and the resonator from which it is deviated onto the photodetector.

15 Claims, 1 Drawing Figure

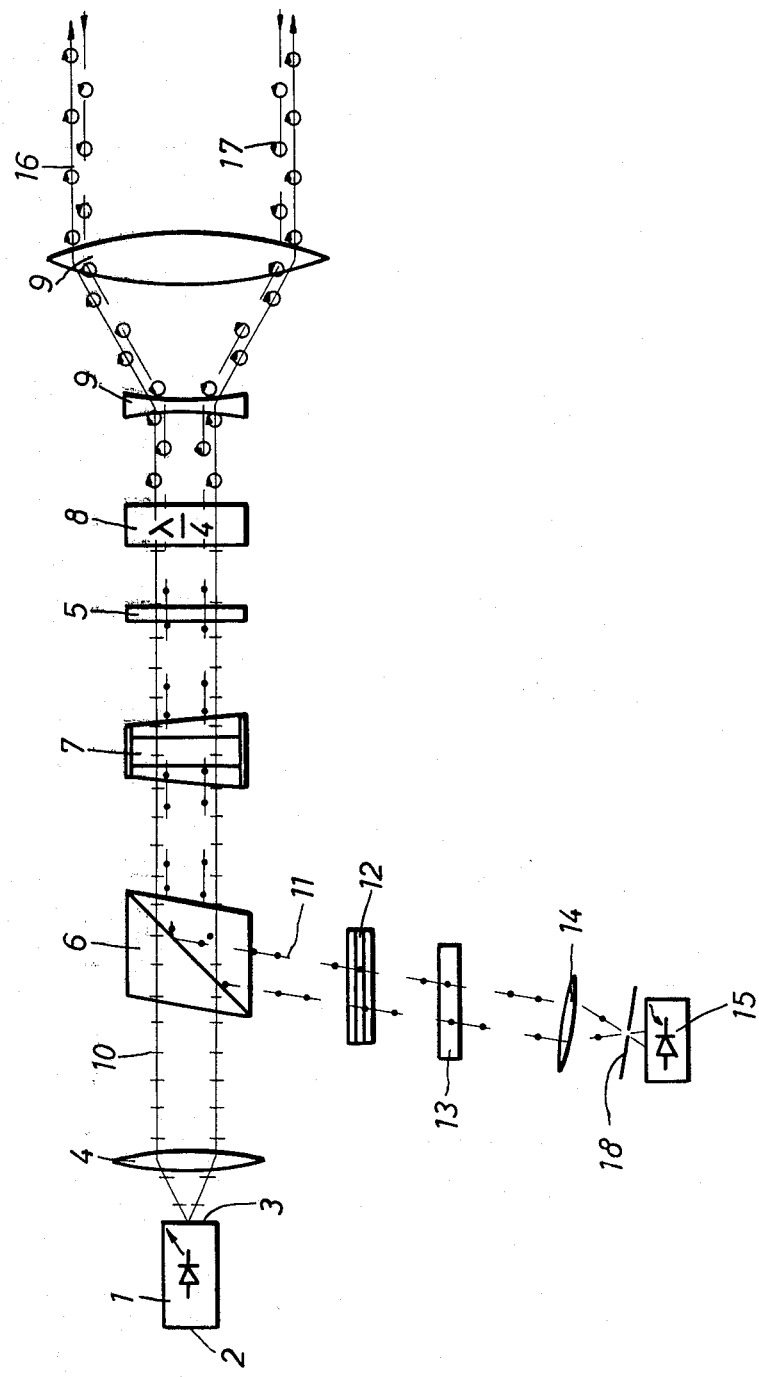

LASER TRANSMITTING AND RECEIVING DEVICE

The invention relates to a transmitting and receiving device having a laser for the production and radiation of monochromatic light and a photodetector for a reflected part of the radiated light.

Understood by "light" in this respect is both visible and infrared and ultraviolet light.

Transmitting and receiving devices of this kind can, for example, be used for optical range finders, for spectroscopy as well as for studies of air pollution and the like. One similar type prior known transmitting and receiving device consists of a semiconductor laser with a transmission objective and a photodetector with a receiving objective arranged next to the transmitting objective. To avoid two separate objectives, it has been proposed to use one objective, common to the transmitter and receiver parts, with a beam divider. However, this has the disadvantage that only a quarter of the available radiation power is utilizable. For example, by using a beam divider having a reflectivity of 50%, half the transmission beam and half the reception beam reflected onto the common objective is deflected from the transmission and reception beam path. The same losses arise generally in transmission and reception devices in which the reception beam is deflected from the region of the transmission beam path.

An aim of the present invention is to provide a device able to deflect a reception beam, extending in the region of the transmission beam path, onto a photodetector without any substantial losses in power of the radiated or received beam during transmission or reception, respectively.

According to the present invention there is provided a transmission and reception device comprising a laser for the production and radiation of monochromatic light, a photodetector for detecting a reflected part of the radiated light, a first polarizer arranged in the beam path of a resonator of the laser, and a second polarizer arranged in the direction of radiation behind a decoupling mirror of the resonator, the first polarizer being operative to pass one of two light beam components linearly polarized perpendicularly to one another and to deflect the other linearly polarized component out of the resonator onto the photodetector the second polarizer being operative to convert linearly-polarized light into circularly-polarized light.

Since, by means of the first polarizer which is arranged in the resonator and which is formed, for example, by a double-refracting polarizing prism, only one of two light beam components which are polarized perpendicularly to one another are reflected to and fro between the two resonator mirrors of the laser, only this component starts oscillating and a linearly polarized laser beam is produced. This is converted, upon passing throught the second polarizer which, for example, comprises a quarter-wave plate, into a circularly polarized transmission beam. Upon the reflection of the transmission beam, the direction of rotation of the circular oscillation is reversed. The direction of rotation of the reception beam impinging on the second polarizer is thus opposite to the direction of rotation of the transmission beam. The reception beam which is linearly polarized after passage through the second polarizer is therefore polarized perpendicularly to the laser beam produced in the resonator, and it is thus deflected by the first polarizer completely onto the photodetector. Since the transmission beam is completely let through by the first polarizer and the reception beam is completely deflected, no losses of any kind in the transmission or reception radiation power occur in the case of the device in accordance with the invention. Crucial for avoiding losses in the transmission radiation power is the arrangement of the first polarizer in the resonator, whereby when the laser starts to oscillate only the linearly polarized light waves which are allowed through the first polarizer are amplified. If the first polarizer were to be arranged outside the resonator, between the decoupling mirror and the second polarizer, then such losses would generally be unavoidable.

Preferably arranged between the decoupling mirror and the first polarizer is a filter or dispersive element, for example, a Fabry-Perot etalon or an interference filter which allows through a spectral range which lies in the amplification region of the laser and which is smaller relative to this. In the same way as a result of the first polarizer, when the laser starts to oscillate only linearly polarized light of the desired direction of polarization is amplified, the filter brings about an exclusive amplification of the laser spectrum lying in its transmission width, so that the band width of the transmission beam is made smaller without loss. Since the frequency range of the transmission or reception beam is determined by the filter itself, the reception beam passing through decoupling mirror into the resonator runs through the filter without loss. However, extransous light, with the exception of the extremely small fraction of the extraneous light which lies in the spectral transmission range of the filter, is filtered out by the filter, and thus does not arrive at the photodetector.

Compared with known transmission and reception devices in which both at the output of the transmitter and at the input of the receiver a respective filter is arranged, the preferred embodiment of the invention has the advantage that no losses in the transmission and reception radiation power occur and mutual adaption of the two filters is abolished. Losses of transmission radiation power are unavoidable in the case of a filter which is arranged at the output of the transmitter, behind the decoupling mirror of the laser resonator, since only a part of the transmission radiation power produced in the resonator is transmitted by the filter. Losses of reception radiation power occur more especially in the case of mutual shifts, caused by temperature fluctuations, of the pass bands of the two filters. In the case of particularly narrow-band filters, it is possible for a mutual shift of the two pass bands to occur in which the two bands do not overlap one another, so that the reception beam is no longer allowed through.

One exemplified embodiment of the invention will hereinafter be further described with referenced to the accompanying drawing which is a schematic representation of a transmission and reception device constructed in accordance with the present invention and comprising a diode laser with an external resonator.

The diode laser 1 is a GaAs-GaAlAs-Single-Hetero structure one end face 2 of which to the left in the drawing, is metallized and the other end face 3, of which to the right in the drawing is, coated for dereflection. The wave length of the emitted radiation is 0.9 μm. The dereflected end faces 3 of the laser 1 is arranged in the focal plane of a lens 4 such that the light radiated by the diode laser 1 is formed into a parallel beam with a comparatively large aperture angle. The metallized diode laser end-face 2 and a decoupling mirror 5 arranged at a spacing from the lens 4 together form two resonator mirrors. The decoupling mirror 5 is a glass plate whose one face is coated for dereflection and whose other face has a degree of reflection of about 4%. This comparatively low degree of reflection does indeed lead to a high threshold current density of the diode laser 1, something which is, however, thoroughly desirable for example for high-power laser diodes. Arranged between the lens 4 and the decoupling mirror 5 is a polarizing prism 6 and a Fabry-Perot etalon, the prism 6 being of double-refracting material, for example a Glan-Thompson prism having an air gap. The etalon 7 is a glass etalon having a thickness of 0.1 mm and a reflectivity of 83% on both sides. The half-value width of the etalon amounts to between 0.15 and 0.2 mm. A quarter-wave plate 8 is arranged in the direction of radiation behind the decoupling mirror 5 and adjacent the quarter wave plate 8 is a collimator 9 consisting of an optical system for widening a transmission beam. The polarizing prism 6 passes one of two light beam components 10 polarized perpendicularly to one another, this one beam being indicated in the drawing by short vertical strokes. The other light beam component 11, which is indicated in the drawing by dots, is deviated by the polarizing prism 6. Arranged in the beam path of the deviated light beam component 11 are, successively, a polarization filter 12 which passes the light beam component 11, an interference filter 13 whose band width is somewhat greater than the band width of the radiated light beam 16, a lens 14 which focuses the light beam component 11 onto the aperature of a pin hole shutter 18, and photodetector 15. The aperture of the shutter 18 is so dimensioned that only light within a transmission solid angle is passed to the photodetector 15, while interferring or stray light, incident at angles outside the transmission solid angle, does not arrive at the photodetector 15.

The decoupling mirror of the laser resonator may consist of a reflecting layer applied to the quarterwave plate.

The basic mode of operation of the invention and of the preferred embodiment has already been explained; the following description of the mode of operation of the depicted transmission and reception device follows from the explanation already given.

When the laser 1 (which includes resonator mirrors 2 and 5) begins oscillation only the light beam component 10 which passed by the polarization prism 6 and whose band width lies in the pass range of the Fabry-Perot etalon 7 is amplified. The linearly-polarized laser beam 10 decoupled by the decoupling mirror 5 is converted, by passage through the quarter-wave plate 8, into a circularly-polarized beam 16, for example having oscillation rotating round to the right. This right circularly polarized beam is identified in the drawing by small circles with arrows indicating the direction of rotation. The beam 16 is widened by the collimator 9. Upon the reflection of the transmission beam 16 at a remote surface (not shown), the direction of revolution of the circularly polarized beam is reversed. The received beam impinging on the collimator 9 is a left circularly-polarized beam 17, which is again shown by circles and arrows indicating the direction of rotation. The reception beam 17 is bunched by the collimator 9 and runs through the quarter-wave plate 8. In so doing, the beam 17 circularly polarized to the left is converted into the linearly-polarized light beam 11, which runs through the decoupling mirror 5 and the etalon 7 to the polarizing prism 6 and is deviated by refraction and reflection onto the photodetector 15. Extraneous light passing through the collimator 9 into the resonator 2, 5 is not passed by the etalon 7 and therefore does not arrive at the photodetector 15. The polarization filter 12 and the interference filter 13 are not necessary for the device and merely serve to prevent possible stray light from the polarizing prism 6 and other extraneous light from impinging on the photodetector 15.

In another embodiment (not shown) of the invention a liquid laser is employed and the dispersive element 7 is tunable, so that the spectral pass range may be varied in the amplification range of the liquid laser.

Instead of the polarizing prism 6, a dielectric multilayer polarizer could be used.

The transmission and reception device in accordance with the invention may be used in various ways and the type of laser employed will be selected depending on the use. However, it is always preferable to employ a laser which is homogeneously widened. Two particularly preferred uses of the device lie within the fields of range-finding and spectroscopy.

The device shown in the drawing, is, for example, particularly suitable for diode-laser range-finders. For spectroscopy and for investigations regarding air pollution it is best to use a liquid laser in which case it is advantageous to employ a tunable dispersive element (for example a Fabry-Perot interferometer) disposed between the first polarizer and the decoupling mirror. By this means the laser wave length can be attuned to the wave length range characterising the corresponding atoms or molecules of a substance and the transmission of the substance can be measured. In this respect, a reflecting surface or device is errected at a spacing from the device, perpendicularly to the transmission beam. To achieve a great range, preferably a highly-reflecting mirror such as a corner cube reflector is used as the reflecting device.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

We claim:

1. A transmission and reception device comprising a laser for the production and radiation of monochromatic light, having an active medium disposed within an optical resonator, said resonator being supportive of a light beam and having a decoupling mirror for the exit of the light beam; a photodetector for detecting a reflected part of the radiated light beam; a polarizer arranged in the beam path of said resonator and a polarization converter arranged outside said resonator in the beam path of the radiated light, said polarizer being operative to pass one of two light beam components linearly polarized perpendicularly to one another and to deflect the other linearly polarized component out of the resonator onto the photodetector and said polarization converter being operative to convert linearly-polarized light into circularly-polarized light and vice versa; and a filter arranged in the beam path of said resonator, between said polarizer and said decoupling mirror, said filter being operative to pass a spectral range which lies in and is smaller than the amplification range of the laser.

2. A device as set forth in claim 1, in which said filter is a Fabry-Perot etalon.

3. A device as set forth in claim 1, including a second filter arranged between said polarizer and said photodetector, said second filter having a spectral pass range of which is the same as or greater than the band width of the radiated light beam, the device also being provided with a second polarizer disposed in the path of the light beam component deflected out of the resonator by said first polarizer and operative to absorb any component of light polarized perpendicularly to the deflected beam or to cause deviation of said component away from said photodetector.

4. A device as set forth in claim 1, in which said polarizer comprises a polarizing prism made of double-refracting material.

5. A device as set forth in claim 1, in which said polarization converter is a quarter-wave plate.

6. A device as set forth in claim 5, in which said decoupling mirror comprises a reflecting layer which is applied to the quarter-wave plate.

7. A device as set forth in claim 1, including a collimator arranged outside said resonator in the beam path of the radiated light, said collimator being operative to widen the radiated light beam and to reduce the width of a reflected part of the radiated light beam.

8. A device as set forth in claim 1, in which said laser is a semiconductor laser with an external resonator, said decoupling mirror being spaced from the semiconductor active medium and said polarizer being disposed between the semiconductor active medium and the decoupling mirror.

9. A device as set forth in claim 8 in which that end face of the semiconductor active medium which faces said decoupling mirror is dereflected.

10. A device as set forth in claim 9, in which the reflectivity of said decoupling mirror is less than 30%.

11. A device as set forth in claim 1, in which said laser is a liquid laser.

12. A device as set forth in claim 1, in which said filter is tunable, such that its spectral pass range may be shifted in the amplification range of the laser.

13. A device as set forth in claim 1, in which said laser is a homogeneously widened laser.

14. A device as set forth in claim 1, in which said polarizer is a dielectric multilayer polarizer.

15. A device as set forth in claim 1, including a shutter arranged in front of said photodetector, said shutter having a diaphragm aperture which is arranged at the focal point of a focusing optical system for the reflected part of the radiated light deflected by said polarizer, and is so dimensioned that the photodetector is shielded from interference or stray light from directions outside the transmitting solid angle.

* * * * *